Patented May 7, 1940

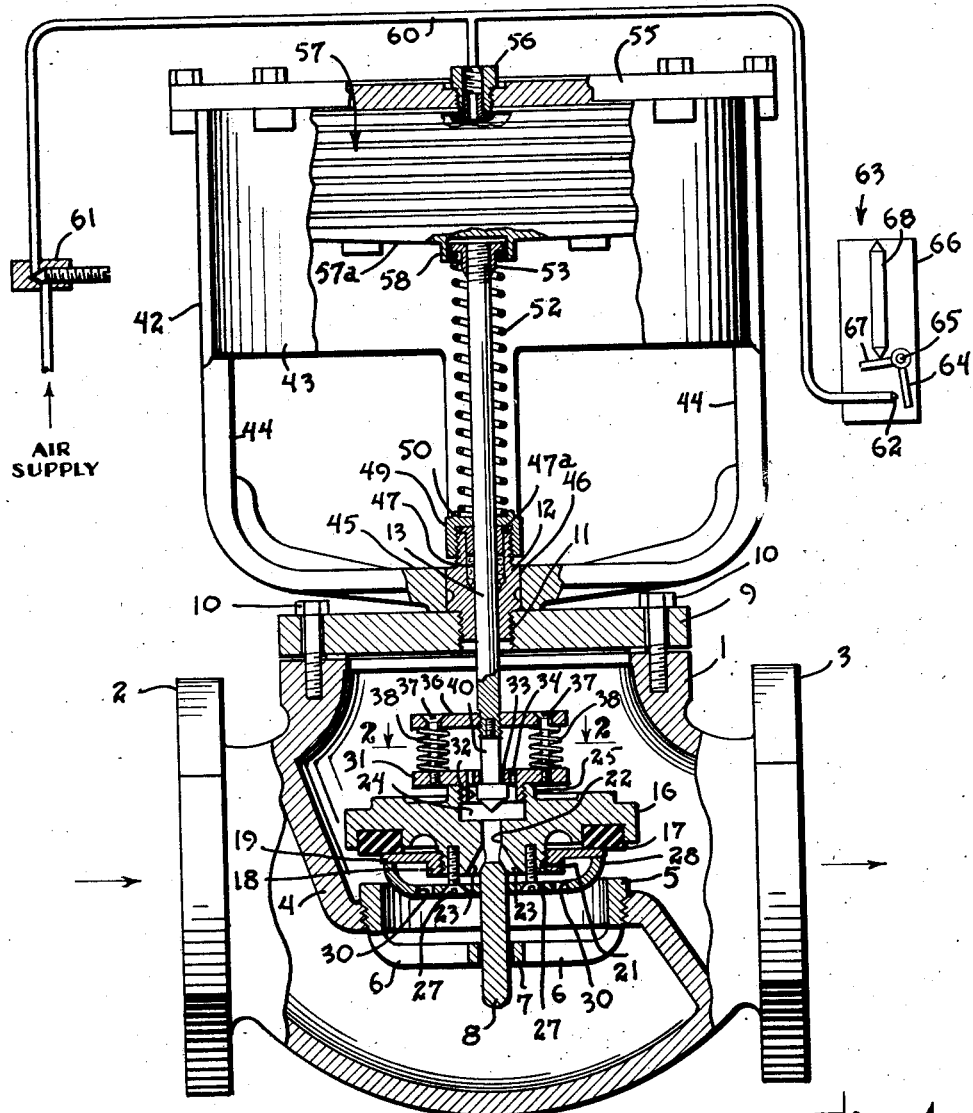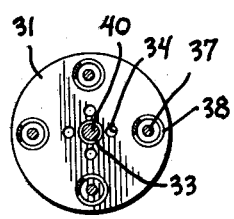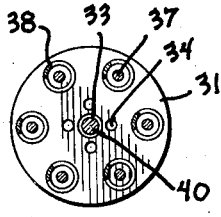

2,200,226

UNITED STATES PATENT OFFICE 2,200,226

VALVE DEVICE

John M. Larson, Chicago, Ill., assignor to Minneapolis-Honeywell Regulator Company, Minneapolis, Minn., a corporation of Delaware Application November 13, 1937, Serial No. 174,297

4 Claims. (Cl. 137—139)

The present invention relates to valve structure and is more particularly concerned with a double valve intended primarily for use in controlling the flow of steam to unit heaters or to steam heating systems generally and the like. It is customary to control steam valves in heating systems or the like in response to a thermostat acting to cause progressive closing of the valve as the temperature rises above the desired value and to cause progressive opening of the valve as the temperature recedes from such desired value. An ordinary throttling valve of proper size functions satisfactorily to sustain the heating load and maintain the desired temperature under certain conditions when the heating load is relatively heavy. However, when the heating load is light, such valves have a tendency to cause hunting of the control system.

It is common practice in heating to completely shut down the heating system or materially reduce heating and maintain a relatively low temperature at night in the building being heated. Necessarily in the morning in order to bring the building temperature up to the desired daytime value, heat must be supplied at a much greater rate than that necessary to ordinarily sustain the daytime load. In the beginning of this pick-up period, the temperature of the heating system itself and the air surrounding the radiators or being passed over the heating coils is relatively low. This causes the condensing rate to be much higher than during normal operation of the system, and thus during the pick-up period, a much greater quantity of steam must be supplied to the system than is necessary after the building is once warmed up. In some systems, it has been found that as much as eight or ten times the flow of steam is necessary during the pick-up period as is necessary for maintaining the building warm thereafter. In order to supply this steam for the pick-up period, it is necessary to provide a much larger valve than is necessary for supplying steam to the system during normal operation. This provision of an oversize valve results in very poor regulation of the system during normal operation. This is caused by the fact that for a very slight movement of the valve, there will be a large change in steam flow therethrough. Thus when the thermostat calls for more heat, the slight opening movement of the valve will cause too much steam to be supplied to the system, which results in the temperature within the building overshooting the control point of the thermostat. The valve will then be moved to completely closed position by the thermostat and will remain closed until the temperature again falls below the control point, at which time the valve will again supply more steam than necessary. This overshooting thus causes the control system to act more as a two-position type of system than as a modulating system, and the temperature maintained within the space is constantly varying above and below the desired value.

Therefore the primary object of my invention is to overcome the above explained serious difficulty in heating control by providing a valve device which will not only handle the large volume of steam required during the morning pick-up period, but will also provide fine modulating of the steam flow and precise control of the temperature during the day without overshooting or hunting.

It is a further object of my invention to provide a valve within a valve, or a double valve, one valve controlling a port through the other and by-passing the other, the two valves being operated sequentially by the same regulating device.

Another object of this invention is the provision of a pressure operated valve having a small by-pass valve associated therewith which is operated at a higher pressure or force exerted by a regulating means whereby the two valves operate sequentially, the first valve closing first and the by-pass valve operating thereafter to throttle the flow of fluid and eventually close.

It is another object of my invention to provide a valve member embodying within itself an additional by-pass valve which may be utilized by substituting it in place of the valve member in present existing valves of standard type, without change in the construction of the elements in such standard valve.

While for purposes of illustration this invention is described as being associated with a steam heating system, it will be understood that it will find application in many and diversified types of equipment, and its novel features will lend themselves to utilization for the accomplishment of manifold purposes and objectives.

Figure 1 is a side elevation of applicant's valve device having a portion thereof shown in cross section.

Figure 2 is a cross sectional view taken along line 2—2 of Figure 1 showing a detail structure.

Figure 3 is a view similar to that of Figure 2 showing a slightly modified form of the detail structure of Figure 2.

The valve device illustrated in Figure 1 is a thermostatically controlled throttling valve having a valve body of the globe type indicated by reference numeral 1 and having an inlet and an outlet indicated by the arrows showing the path of flow through the valve. The valve body 1 has integral flange members 2 and 3 which have smooth faces and are arranged for connecting to conduits for conveying fluid to and from the valve. Within the valve body 1 is an integral dividing member 4 which separates the inlet portion of the valve chamber from the outlet portion. The dividing member has a circular internally threaded opening in its central horizontal portion into which is screw threaded a circular member 5 which forms a valve seat and which has members 6 extending downwardly therefrom and which are integrally connected to a circular bearing portion 7 through which extends a guide member 8. Numeral 9 indicates a cap or cover member for the valve and is suitably secured thereto by screws 10. The cap member 9 has a centrally located screw threaded opening 11 into which is screwed a member 12 which forms a packing gland. Through the member 12 forming the packing gland extends a valve stem 13 which connects to the valve member and constitutes the actuating means therefor. The valve may be actuated by any suitable automatic means or by hand, and in the present instance is illustrated as being actuated by a thermostatic device which will be described later.

Referring to the valve member itself, numeral 16 represents a generally circular member having an annular recess shaped to receive a seat member 17. The seat member is of annular conformation, being rectangular in cross section as shown and being shaped to be tightly engaged in the annular recess of member 16. Member 17 may be made of any suitable material such as hard rubber whereby the valve can be made to fit tightly against its seat. Numeral 18 represents a retaining nut screwed onto the lower portion of the valve member 16 and having a flange 19 for retaining the seat member 17 securely in the annular recess of member 16. The valve member 16 has an integrally formed guide member 8 previously referred to, which extends downwardly from the lower part thereof and through the bearing member 7 whereby the valve is constained to move accurately in a vertical direction with respect to the valve body. The valve member 16 has a centrally located port 22 which communicates with circularly arranged angular passages 23 which are arranged in spaced relation around the guide member 8. The port 22 communicates at its upper end with a larger opening 24 in the upper part of member 16. Surrounding the upper portion of this opening is a circularly arranged flange 25 having internal screw threads as shown.

Numeral 31 represents a circular plate or disc having a downwardly extending flange portion 32 which is screw threaded into the flange portion 25 of the valve member 16. The disc member 31 has a central opening 33 which forms a guide bearing for the lower part of the valve stem 13. Arranged circularly around the central opening 33 are a number of small ports 34 which provide communication from the space or opening 24 in the upper part of the valve member 16 through the disc member 31 to the outlet side of the valve. Numeral 36 represents a circular plate or disc member similar to the member 31 and having a central opening in screw threaded relation with the valve stem 13. The plate member 36 is connected to the member 31 and spaced therefrom by a number of machine screws 37. Each machine screw is located within a coil spring 38 so that the ends of the coil springs bear against the plates 31 and 36, respectively, and tend to retain them in spaced relation. The lower end of the valve stem 13 has a valve member 40 screw threaded thereinto which with port 22 forms a valve and which may be reciprocated in the opening 33 by movement of the plates 36 and 31 with respect to each other. The seat for the valve member 40 is formed by the upper end of the port 22 in the valve member 16, and it will be readily seen that the force necessary to move the valve member 40 towards its seat is dependent upon the number of springs 38 serving to space the plate members 31 and 36. When the valve stem 13 is moved downwardly it is obvious that the entire valve assembly will be moved bodily downwardly until the valve member 16 becomes seated. The valve stem 13 then meets additional resistance to further downward movement and begins to move the plate 36 downwardly with respect to plate 31 thereby compressing the springs 38. The plates 36 and 31 may be drilled and screw threaded so as to receive any number of machine screws ranging from two to eight or more so that the number of machine screws and associated springs may be used in groups of two, four, six or eight. The number of springs may be conveniently varied by simply inserting additional springs and machine screws or by removing machine screws and simultaneously the springs associated therewith. Two machine screws and springs are shown in Figure 1 while Figures 2 and 3 illustrate the manner of arranging the springs in groups or four or six, respectively. The flexibility of this arrangement, whereby the force exercised by springs 38 tending to space the plates 36 and 31 may be varied, constitutes an important feature of the present invention inasmuch as the spring rate of the assembled group of springs and the characteristics thereof may be varied as desired.

Secured to the bottom of the valve 16 by machine screws 27 is a throttling plate or disc indicated by the numeral 28. The lower surface of the throttling disc 28 is generally flat and it has curved cross-sectional contour or profile so that its edges turn upwardly as shown to engage the outer edge of the flange 19 of retaining nut 18. The throttling disc 28 may have a cross-sectional contour or profile to provide the necessary throttling effect in the valve. The throttling disc 28 has two or more openings indicated at 30 for the purpose of providing communication from the inlet side of the valve to the passages 23.

Externally to the valve itself is a shell or cage member 42. The cage member 42 has a generally cylindrical casing-like member 43 at its upper portion from which integrally formed legs 44 extend downwardly in uniform spaced relation. These members 44 converge inwardly and join so as to form a generally flat horizontal portion indicated at 45 having a circular opening 46. The joined portions of the members 44 having the opening 46 is secured to the packing gland 12 which has previously been described. The packing gland member 12 is of conventional formation and has packing medium 47 therein which is retained and compressed by a flanged member 47a such as is ordinarily used in packing glands. Numeral 49 indicates a packing nut in screw threaded relation with the upper nipple of the packing gland member 12, and internally engaging the member 47a whereby the packing nut 49 forces the member 47a against the packing medium 47 to compress it against the inner walls of the packing gland member 12 and against the sides of the valve stem 13 to prevent leakage. On the upper surface of the packing nut 49 is a flanged portion 50 which forms a retainer for a spring 52. At the upper end of the valve stem 13 is a flanged spring retaining nut 53 which engages the opposite end of the spring 52 so that the spring is engaged in compressed relation between the packing nut 49 and the spring retaining nut 53. Obviously the spring 52 exerts a force against the spring retaining nut 53 tending to move the valve stem 13 and the valve upwardly away from the valve seat 5.

The upper casing-like portion 43 has a cap or cover member 55 suitably secured thereto by bolts or the like as shown. The cap member 55 has a central opening into which is screw threaded a nipple member 56. Casing-like portion 43 serves to enclose a motor device generally indicated at 57 for operating the valve automatically in response to pressure transmitted to the motor device. This motor device 57 may be of any desired type, and as disclosed takes the form of a motor made up of a plurality of cells. Each cell is comprised of a pair of diaphragms joined so as to form a sealed space therebetween which is in communication with the next adjacent cell, and all of them being in communication with the source of controlled external pressure. The number of such cells of course may be varied as desired so as to provide the necessary amount of power for operating the valve. The lower cell of the above described group of cells abuts against a diaphragm base plate 57a which is provided with a downwardly extending flange portion 58 of circular conformation, whereby a retaining element is formed therein for the spring retaining nut 53. It will be apparent that upon inflation of the motor device or diaphragm 57, the base plate 57a will be urged downwardly, thereby urging the valve towards closed position.

The space within the interior of the cells comprising the motor device 57 communicates through the nipple 56 with an air line 60. The air line 60 communicates through a suitable restrictor 61 with a source of air supply for operating the valve and also communicates wtih a bleed port 62 associated with a thermostatic device which controls the air pressure in the line 60 whereby the valve is controlled. The source of air supply is generally at 15 lbs. pressure and the pressure beyound the restricting device 61 is determined by the rate of air being bled from the port 62. The pressure from the line 60 communicates with the interior of the cells or diaphragms comprising the motor device and therefore the degree of expansion or contraction of the diaphragms is dependent upon the pressure in the air line 60. The thermostatic device generally indicated at 63 for controlling the bleed port is of conventional and well known type and need not be described in detail. This thermostatic device includes an expansible temperature responsive element 66 comprising a rubber tube within which is located a lever arm 64 pivoted at 65, said lever arm having an integral actuating arm 67. Mounted between the arm 67 and one end of the tube is an invar strip 68. Expansion or contraction of the tube 66 causes the arm 64 to be moved nearer or farther from the bleed port whereby the rate of air bleeding corresponds to the temperature surrounding the device.

The operation of my improved control valve should be apparent to those skilled in the art from the above structural description. In the morning after a night shut down, the temperature surrounding the thermostatic device 63 will be at a relatively low value so that the arm 64 will be relatively far from the bleed port 62, causing the pressure within the motor device 57 to be at a low value. The valve will be in wide open position so as to permit the passage of a large volume of steam to the points of radiation in the building being heated. The room temperature will gradually rise until a temperature of, for example, 68° is reached. At this temperature the thermostatic device will cause arm 64 to move towards the bleed port 62 sufficiently to produce a pressure of 1 lb., for example, in the motor device 57. As the temperature continues to rise the pressure in the motor device 57 will continue to build up, causing spring 52 to be compressed moving the larger valve in closing direction. At a temperature of 69° in the room, the pressure within the motor device 57 will have built up to 7 lbs. per square inch and the larger valve will be seated. Steam will now only be supplied by the smaller by-pass valve within the larger valve. As the temperature continues to rise, the pressure within the motor device 57 will rise to a value of, for example, 8 lbs. which will be sufficient to begin to close the smaller by-pass valve against the force of springs 52 and also the springs 38. It will be seen that in order to move the smaller by-pass valve in closing direction, the motor device 57 must act against the combined force of springs 52 and 38. If the room temperature should continue to rise, the pressure within the motor device 57 would build up still further and at a pressure therein of, for example, 11 lbs. per square inch, the small by-pass valve will be completely closed, entirely shutting off the flow of steam therethrough. The smaller valve is arranged to be fully closed at a temperature of 71°, corresponding to the above mentioned pressure of 11 lbs. per square inch in the motor device 57. Complete closure of both valves should result in the room temperature beginning to fall back to the desired predetermined value of 70°. By reason of the provision of the small by-pass valve for controlling the steam flow when the temperature is within the vicinity of the predetermined desired value, precision control may be obtained whereas it cannot be with a larger valve intended for controlling a much larger flow of steam. The throttling characteristics of the small valve can be accurately adjusted by varying the number of springs 38 as previously described.

From the foregoing, it should be apparent that my improved control valve provides a device which eliminates the difficulties heretofore present in the control of heating systems. The smaller valve having accurate throttling characteristics eliminates the overshooting and consequent hunting which occurs when a large valve is employed to control a relatively small flow of steam for maintaining the desired predetermined temperature.

The valve body and operating mechanism as employed with my invention, are of standard construction. In my improvement, a valve device having a smaller by-pass valve therein can be substituted for the valve mamber in existing valves of standard type. Thus, in present heating systems wherein it is found that accurate control of the temperature cannot be obtained, this improved double valve member may be substituted for the valve member in the control valve already in the system, thereby remedying the defects in the control of the system at very low cost.

While the invention has been disclosed in connection with one practical application, it is expressly understood that it may have equal utility and value in various other fields and types of equipment. As there are many variations and modifications both as to structure and application, which are apparent to those skilled in the art and which are within the spirit and scope of my invention, I desire to be limited only as determined by the appended claims.

I claim as my invention:

1. A flow controlling device comprising a main valve member movable toward and away from a main valve seat, means for moving said valve member towards and away from said seat, means connecting said valve member and said moving means, said means comprising a plurality of headed studs secured to the back of said valve member and extending outwardly therefrom, a compression spring surrounding each of said studs, each of said springs bearing against said plate member, a second plate member secured to said moving means, apertures in said second plate member for receiving said studs, said second plate member being yieldingly secured between the heads of said studs and the opposite ends of said compression springs, said valve member having an aperture therethrough providing free communication between the high and the low pressure sides of said valve member when the valve member is in closed position, a second valve member cooperating with said aperture to control the flow of a fluid therethrough when the main valve member is in closed position, and means connecting said second valve member with said moving means for movement therewith whereby after the main valve member has been moved to closed position by the moving means, further movement of the moving means will cause movement of said second valve member towards closed position to accurately control the flow of small amounts of fluid through said aperture.

2. A flow controlling device comprising a main valve member movable toward and away from a main valve seat, a pressure actuated motor comprising a chamber having a movable wall, means connecting said main valve member and said motor, said connecting means including a first plate member secured to the back of said main valve member, a plurality of headed studs extending outwardly from said first plate member, a compression spring surrounding each of said studs, a second plate member secured to said motor, apertures in said second plate member for receiving said studs, said second plate member being yieldably secured between the heads of said studs and the opposite ends of said compression springs, said main valve member having an aperture therethrough providing free communication between the high and low pressure sides of said main valve member, a second valve member cooperating with said aperture to control the flow of fluid therethrough when the main valve member is in closed position, said second valve member being connected to said motor and to said second plate member, means independent of said springs for biasing said motor in a direction to urge said main valve member from its seat, whereby upon increase in pressure applied to said motor from a minimum to a maximum, the main valve member is moved towards its seat against the action of said biasing means, said second valve member at such time being withdrawn from its seat, and whereby upon continued increase in pressure after said main valve engages its seat, the second valve is moved towards its seat against the combined biasing action of said biasing means and said springs.

3. A flow controlling device comprising a valve casing having inlet and outlet passages communicating through a main valve port having a main valve seat, a main valve member movable towards and away from said main valve seat, an auxiliary throttling valve port in said main valve member, a throttling valve member associated with said throttling valve port for controlling the flow of medium through said throttling valve port, said throttling valve member being arranged to recede from its seat in the same direction as the main valve member recedes from its seat, said throttling valve port communicating in a substantially unrestricted manner with the inlet and outlet passages of the valve casing so that the throttling valve member and valve port cooperate in passing a controlled flow of medium from the inlet passage to the outlet passage when the main valve member engages its seat, the flow of medium through said throttling valve port being determined by the position of the throttling valve member relative to its seat, stop means for limiting the travel of said throttling valve member relative to said main valve member, spring means for biasing said throttling valve member towards said stop means, a pressure actuated motor including a chamber having a movable wall, connecting means between said movable wall and said throttling valve member for causing said throttling valve member to move correspondingly with said movable wall, and main biasing means for biasing said movable wall in the direction tending to cause said valve members to recede from their respective seats, said movable wall acting only against said main biasing means when the main valve member is disengaged from its seat, while acting against the combined action of said main biasing means and said spring means for positioning said throttling valve member relative to its seat when the main valve member engages its seat.

4. A flow controlling device comprising a valve casing having inlet and outlet passages communicating through a main valve port having a main valve seat, a member movable towards and away from said main valve seat, a pressure actuated motor comprising a chamber having a movable wall, said motor including a biasing means opposing the action of pressure applied to one side of said movable wall to cause the position assumed by said movable wall to vary with the pressure applied thereto, a throttling valve port formed in said main valve member, a throttling valve member associated with said throttling valve port for controlling the flow of medium through said throttling valve port, said throttling valve port communicating in a substantially unrestricted manner with the inlet and outlet passages of the valve casing so that the throttling valve member and valve port cooperate in passing a controlled flow of medium from said inlet passage to the outlet passage when the main valve member engages its seat, the flow of fluid through said throttling valve port being determined by the position of said throttling valve member relative to its seat, connecting means between said throttling valve member and said movable wall for moving said throttling valve member correspondingly with said wall, spring biasing means for biasing said throttling valve member relative to its seat, and stop means associated with said connecting means for causing said connecting means to positively move said main valve member towards and away from its seat when said throttling valve is a predetermined distance from its seat.

JOHN M. LARSON.

CERTIFICATE OF CORRECTION.

Patent No. 2,200,226.

May 7, 1940.

JOHN M. LARSON.

It is hereby certified that error appears in the printed specification of the above numbered patent requiring correction as follows: Page 4, second column, line 55, claim 4, before the word "member" insert --main valve--; and that the said Letters Patent should be read with this correction therein that the same may conform to the record of the case in the Patent Office.

Signed and sealed this 30th day of July, A. D. 1940.

Henry Van Arsdale,
Acting Commissioner of Patents.

(Seal)